(12) United States Patent
Habacker

(10) Patent No.: US 8,322,777 B2
(45) Date of Patent: Dec. 4, 2012

(54) SOFT TOP FOR A MOTOR VEHICLE, PARTICULARLY A CONVERTIBLE, COMPRISING A FOLDING ROOF

(76) Inventor: Norbert Habacker, Bramsche (DE)

( * ) Notice: Subject to any disclaimer, the term of this patent is extended or adjusted under 35 U.S.C. 154(b) by 213 days.

(21) Appl. No.: 12/594,308

(22) PCT Filed: Mar. 31, 2008

(86) PCT No.: PCT/DE2008/000525
§ 371 (c)(1),
(2), (4) Date: Jul. 29, 2010

(87) PCT Pub. No.: WO2008/119333
PCT Pub. Date: Oct. 9, 2008

(65) Prior Publication Data
US 2010/0289292 A1   Nov. 18, 2010

(30) Foreign Application Priority Data
Apr. 2, 2007 (DE) .......................... 10 2007 015 705

(51) Int. Cl.
*B60J 7/185* (2006.01)

(52) U.S. Cl. ....................................... 296/121; 296/124
(58) Field of Classification Search .................. 296/121, 296/124, 131, 132
See application file for complete search history.

(56) References Cited

U.S. PATENT DOCUMENTS

| | | |
|---|---|---|
| 5,839,778 A | 11/1998 | Schaible et al. |
| 5,868,454 A * | 2/1999 | Homann et al. ............. 296/128 |
| 6,033,008 A | 3/2000 | Mattila |
| 6,511,118 B2 | 1/2003 | Liedmeyer et al. |
| 6,585,310 B1 | 7/2003 | Guillez et al. |
| 7,118,162 B2 | 10/2006 | Queveau et al. |
| 2008/0054672 A1 | 3/2008 | Feussahrens et al. |
| 2009/0072590 A1 | 3/2009 | Dietl |

FOREIGN PATENT DOCUMENTS

FR   WO 2006/000672   12/2005

* cited by examiner

*Primary Examiner* — Dennis Pedder
(74) *Attorney, Agent, or Firm* — Gifford, Krass, Sprinkle, Anderson & Citkowski, P.C.

(57) ABSTRACT

A top for a convertible vehicle includes a folding roof which can be moved by a top linkage between a closed position in which it can be fixed to a windshield frame and an open position in which it is stowed in a rear side stowage position.

8 Claims, 6 Drawing Sheets

SOFT TOP FOR A MOTOR VEHICLE, PARTICULARLY A CONVERTIBLE, COMPRISING A FOLDING ROOF

REFERENCE TO RELATED APPLICATIONS

This application is the U.S. National Phase application of PCT/DE2008/000525, filed Mar. 31, 2008, which claims priority from DE 10 2007 015 705.5, filed Apr. 2, 2007, the entire contents of each of which are incorporated herein in their entirety.

FIELD OF THE INVENTION

The invention relates to a top for a motor vehicle, in particular a convertible vehicle, with a folding roof which can be moved between a closed position in which it can be fixed to a windshield frame and an open position in which it is stowed in a rear side stowage position.

BACKGROUND OF THE INVENTION

Tops for convertible vehicles typically have a latching apparatus at the tip or forward end of the roof to connect the roof to a windshield frame in the closed position. A separate locking apparatus is usually provided in the vehicle body to lock the top package in the open position.

The complexity of the apparatus and sensors for such a system is substantial due to the use of a drive for fixing the top to the windshield frame and due to the use of a further drive for fixing the top in a stowage position.

An example of a typical top is shown in EP 0 763 439 B1. The top for a convertible vehicle is held in a closed position at an adjacent windshield frame by means of a latching apparatus. The top can be moved into a rear-side stowage position after release of the latching apparatus. The latching apparatus includes a latching member disposed at a front top portion and having a closure hook. In its folded-back, rear-side stowage position, the top is fixed by means of a latching device. The latching member disposed at the front top portion and having the closure hook also forms an operative part of the rear-side locking device.

A top having a latching apparatus with a closure hook which is an operative part both for fixing of the top in a closed position and in an open position is difficult to adapt to the very small construction space in the respective region. The arrangement of the respective counter-element to the closure hook of the latching apparatus both in the open position and in the closed position of the top is preset to a very large extent with the proposed top. It is difficult to fit into the available construction space, which is also at least partially preset.

SUMMARY OF THE INVENTION

Embodiments of the present invention provide a top for a motor vehicle, in particular a convertible vehicle, in which a secure locking of the top takes place both in the closed state and in the open state of the top by means of a mechanism which is as simple as possible. Also, the fixing of the top is well matched to the construction space conditions both in the open position and in the closed position of the top.

The present invention provides a top for a convertible vehicle, including a foldable roof with a top linkage operable to move the top between a closed position in which it can be fixed to a windshield frame and an open position in which it is stowed in a rear side stowage position. A latching apparatus is operable to fix the top windshield frame in the closed position. The latching apparatus has a drive member and at least one closure hook connected thereto via a linkage. A locking apparatus is operable to lock the roof in the rear-side stowage position. The locking apparatus has at least one locking member and one counter-bearing. Both the locking apparatus and the latching apparatus are actuated by the drive member.

With a top made in accordance with the invention, there is a great deal of freedom both in the arrangement of the latching apparatus having a corresponding counter-member on the windshield frame and in the arrangement of the locking apparatus having a corresponding counter-bearing on the body. The position of the closure hook provided for fixing the top to the windshield frame can be selected independently of the position of the locking member provided for fixing the top in its stowage position. The top in accordance with the invention can thus be adapted flexibly and simply to any demands and restrictions on the construction space which may be present.

The apparatus structure is small due to the actuation of both the closure hook and the locking hook by a common drive.

A high stiffness can be achieved in the fixing of the top in its rear stowage position with the present fixing due to the fixing at the coachwork side, whereby a very secure stowage is made possible.

In a constructionally simple embodiment of the counter-bearing which is fixed to the body and cooperates with the locking member, the counter-bearing is made integral with a main bearing of a top linkage, with the locking member being fixable in the counter-bearing in the rear-side stowage position.

A simple fixing of the top in its rear stowage position can be achieved when the locking member, which is preferably a locking hook, has a bolt-like member which engages into a cut-out of the counter-bearing in the stowage position of the top and fixes it in the counter-bearing.

The locking hook of the locking apparatus can be actuated by the drive member by means of the linkage of the latching apparatus. The drive member may be arranged in a middle region of the top at the windshield frame in the closed position of the top. The locking hook can be linked to the drive member via a simple mechanism.

The locking hook can be actuated by means of a coupling rod which can be actuated by the drive member. The coupling rod may be coupled to a linkage extending in the transverse direction of the top and driving the latching hook. The locking apparatus can, in contrast to conventional tops, be transposed into a region facing a vehicle side, whereby more space can be provided, for example, for the provision of a mobile rear shelf.

It is advantageous for this purpose for the coupling rod to be arranged substantially coaxially to a driving rod of the linkage to which the closure hook is pivotally connected.

Provision can be made in a further embodiment of the invention that a connection rod is pivotally connected to the locking hook, extends in the longitudinal direction of the vehicle and has a latching element at its end remote from the locking hook by means of which two roof parts can be connected to one another. With a corresponding design, all closures of roof parts can thus advantageously be controlled via the drive member, which may be a center drive.

In an alternative embodiment of the invention, the top can be actuated manually via a correspondingly made drive member.

Further advantages and disadvantageous embodiments of a top in accordance with the invention result from the claims, the drawings and the description.

BRIEF DESCRIPTION OF THE FIGURES

An advantageous embodiment is described in principle in the following with reference to the drawing.

DETAILED DESCRIPTION OF THE INVENTION

Figure 1:
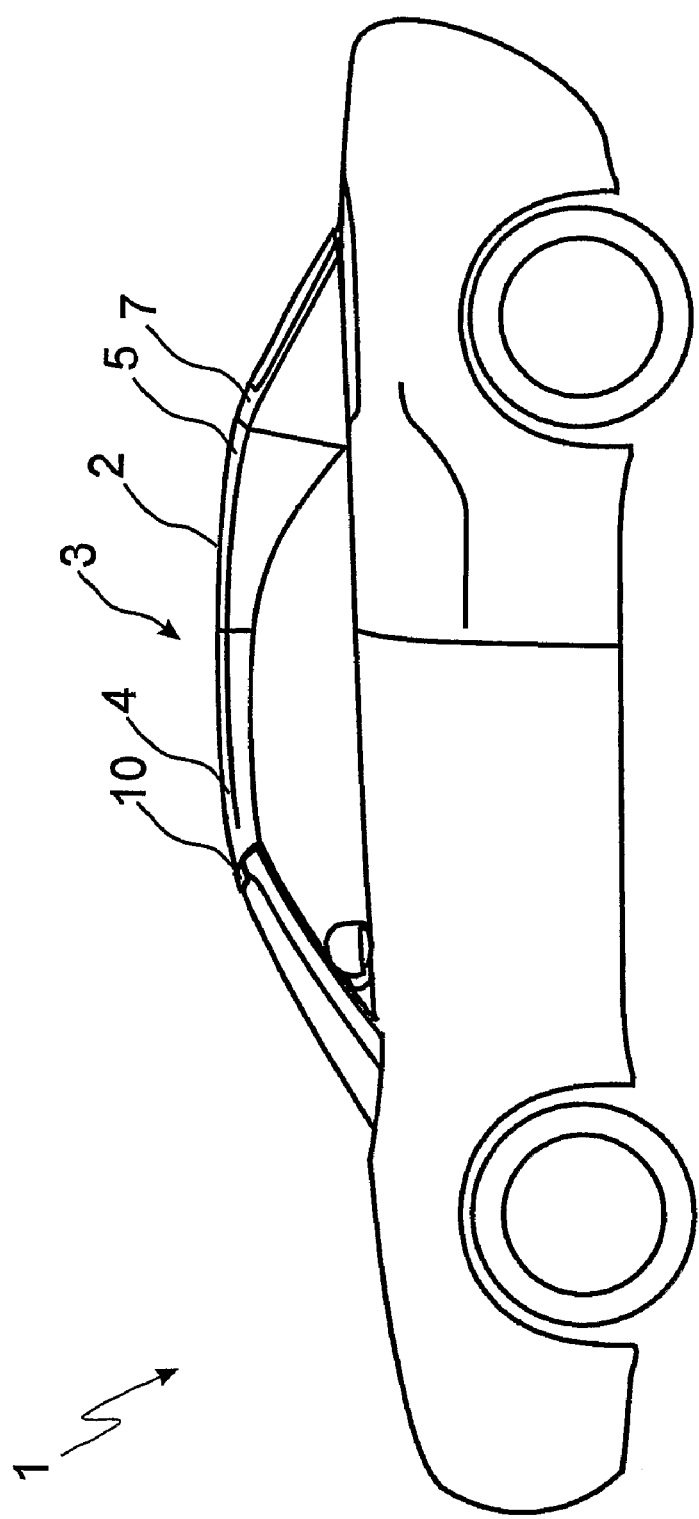
FIG. 1 shows a simplified representation of a convertible vehicle with a top in a closed position.

A convertible vehicle 1 is shown in FIG. 1 comprising a top 3 having a foldable roof 2 and made as a hard top, said top being shown in a closed position.

Figure 2:
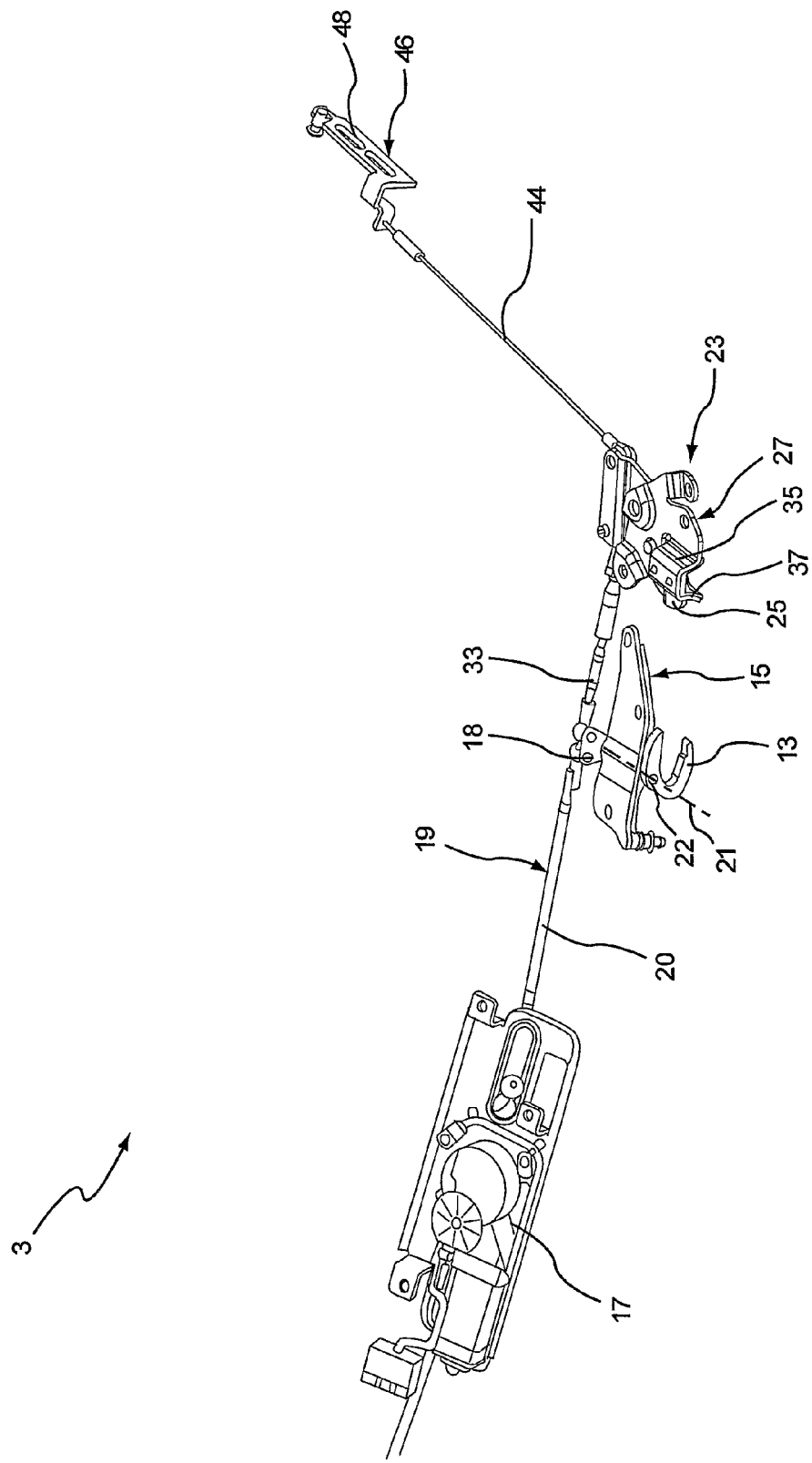
FIG. 2 shows a simplified representation of a drive mechanism for fixing the top to a windshield frame in an open position and for fixing the top to a counter-bearing on the body in a closed position.

The top 3 is made with three roof segments 4, 5, 7, with the front roof segment 4 being fixable in a closed position of the top 3 to a windshield frame 10 by means of a closure hook 13 of a latching apparatus 15 visible in FIG. 2.

The top 3 can be moved from a closed position shown in FIG. 1 to an open position in which the top 3 is stowed in a rear-side stowage position and from the closed position to the open position by means of a top linkage 9. The linkage is located in a rear-side region of the top 3 and is pivotally connected to a main bearing 11 of the top 3 provided for the fastening of the top 3 to a body of the convertible vehicle.

The terms bottom, top, rear, front and center used in the following each relate to the top 3 of the convertible vehicle in an installed state.

In FIG. 2, a drive assembly is disposed in a front center region of the front roof segment 4. A center drive 17 causes the top 3 to be fixed to the windshield frame 10 when the top 3 is closed, by actuating the closure hook 13 of the latching apparatus 15 fixed to the top 3.

A drive rod 20 of a linkage 19 has an end remote from the center drive 17 that is connected to a triangular articulated lever 18. The articulated lever 18 is rotatably fixed to the latching apparatus 15 via a bolt 22. The end of the bolt 22 remote from the articulated lever 18 is rotationally fixedly connected to the closure hook 13.

The center drive 17 can move the drive rod 20 in the transverse direction of the top to fix the closure hook 13 to the windshield frame 10 so that the articulated lever 18 is pivoted at the latching apparatus 15 fixed to the top. A rotation of the bolt 22 about the axis 21 results from this and in turn pivots the closure hook 13 and brings it into engagement with a counter-member at the windshield frame 10 in the closed position of the top. The closure hook 13 can be released from the counter-member at the windshield frame 10 by a movement of the drive rod 20 in the reverse direction.

To secure the top 3 in a stowed position, a locking apparatus 23 is provided which has a sheet metal element 27 fixable to the front roof segment 4 and a locking member, formed as a locking hook 25, pivotally connected to the sheet metal element 27.

The sheet metal element 27 is made with a U-shaped region 35, with the locking hook 25 being pivotally connected to the sheet metal element 27. The locking hook 25 can either be rotated into a cut-out 39 formed in a side 37 of the U-shaped region 35 or can be rotated out of the cut-out 39 on a movement caused by the center drive 17.

To fix the top 3 in a stowage position, the locking apparatus 23 can cooperate with a counter-bearing 28 which is fixed to the body and is integral with the main bearing 11 of the top linkage 9. In the illustrated embodiment, the counter-bearing 28 is part of an extended wall of the main bearing 11 visible in FIGS. 3 to 6. The counter-bearing 28 has a cut-out 29 to receive the locking hook 25 of the locking apparatus 23.

Figure 3:
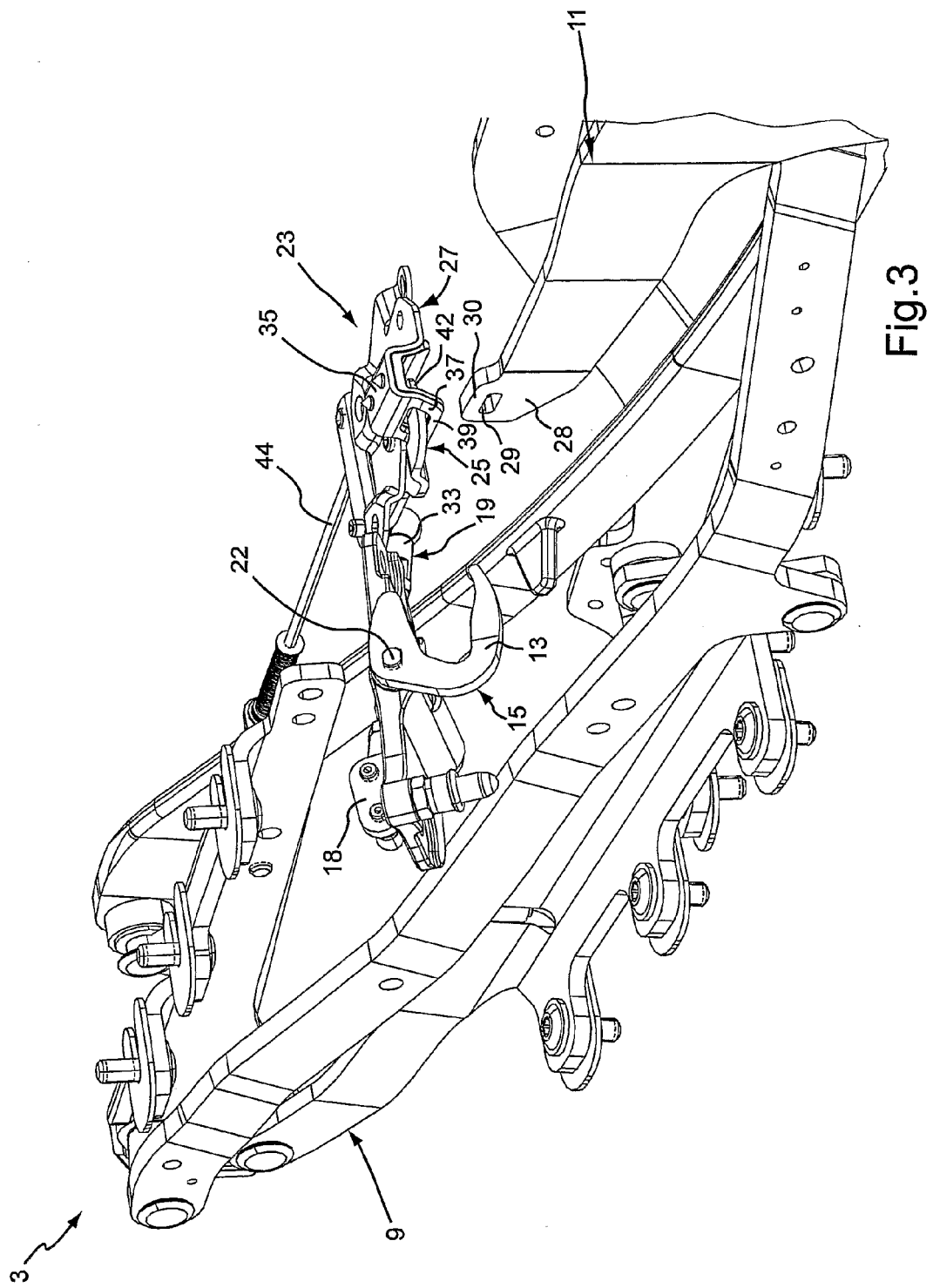
FIG. 3 shows a simplified three-dimensional representation of a top linkage in a state just before connection to the counter-bearing on the body in a rear-side stowage position of the top.
Figure 4:
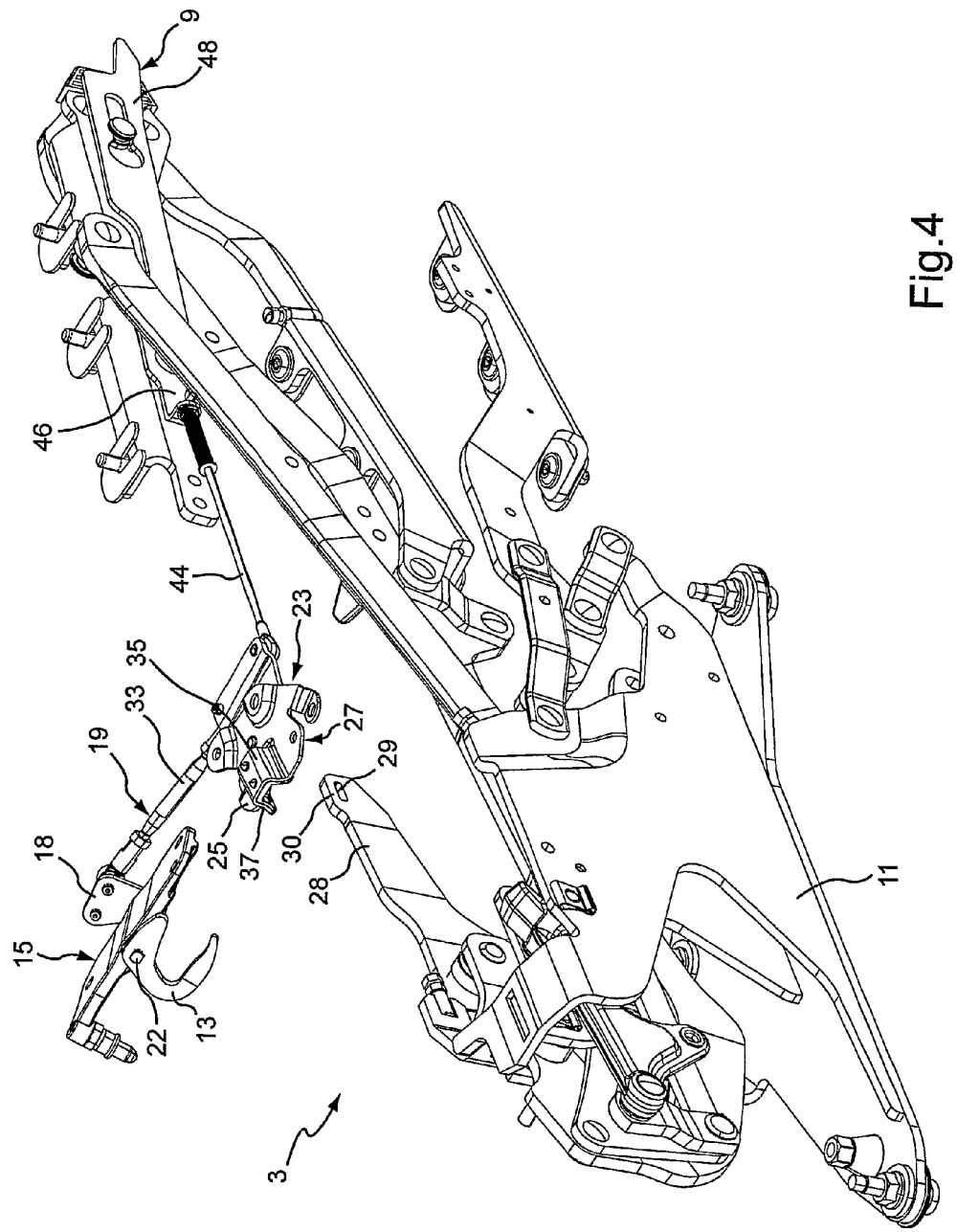
FIG. 4 shows a simplified three-dimensional representation of the top linkage of FIG. 3 from a different perspective.
Figure 5:
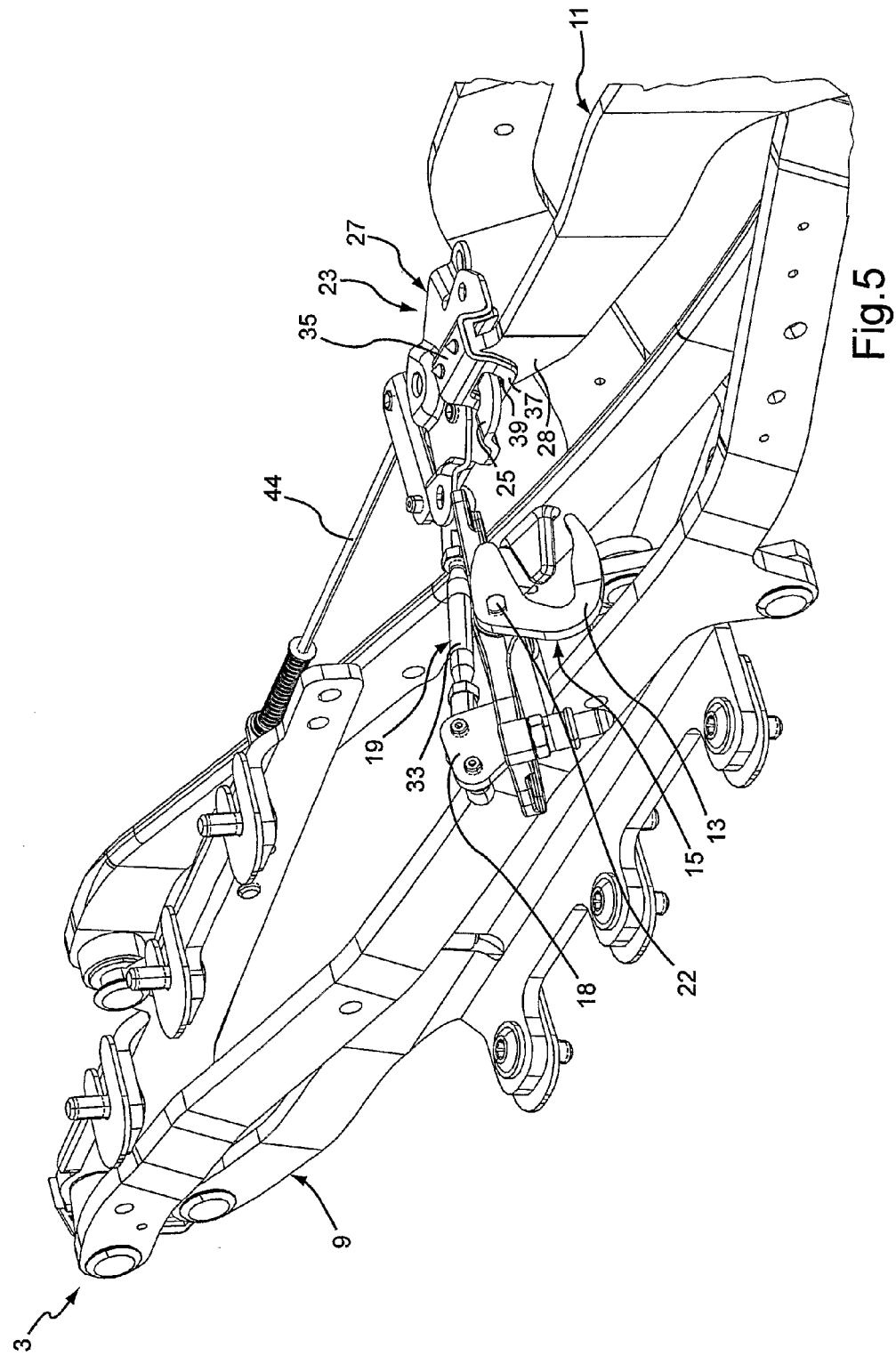
FIG. 5 shows a simplified three-dimensional representation of the top linkage of FIG. 3 and FIG. 4 latched to the counter-bearing in the rear-side stowage position.
Figure 6:
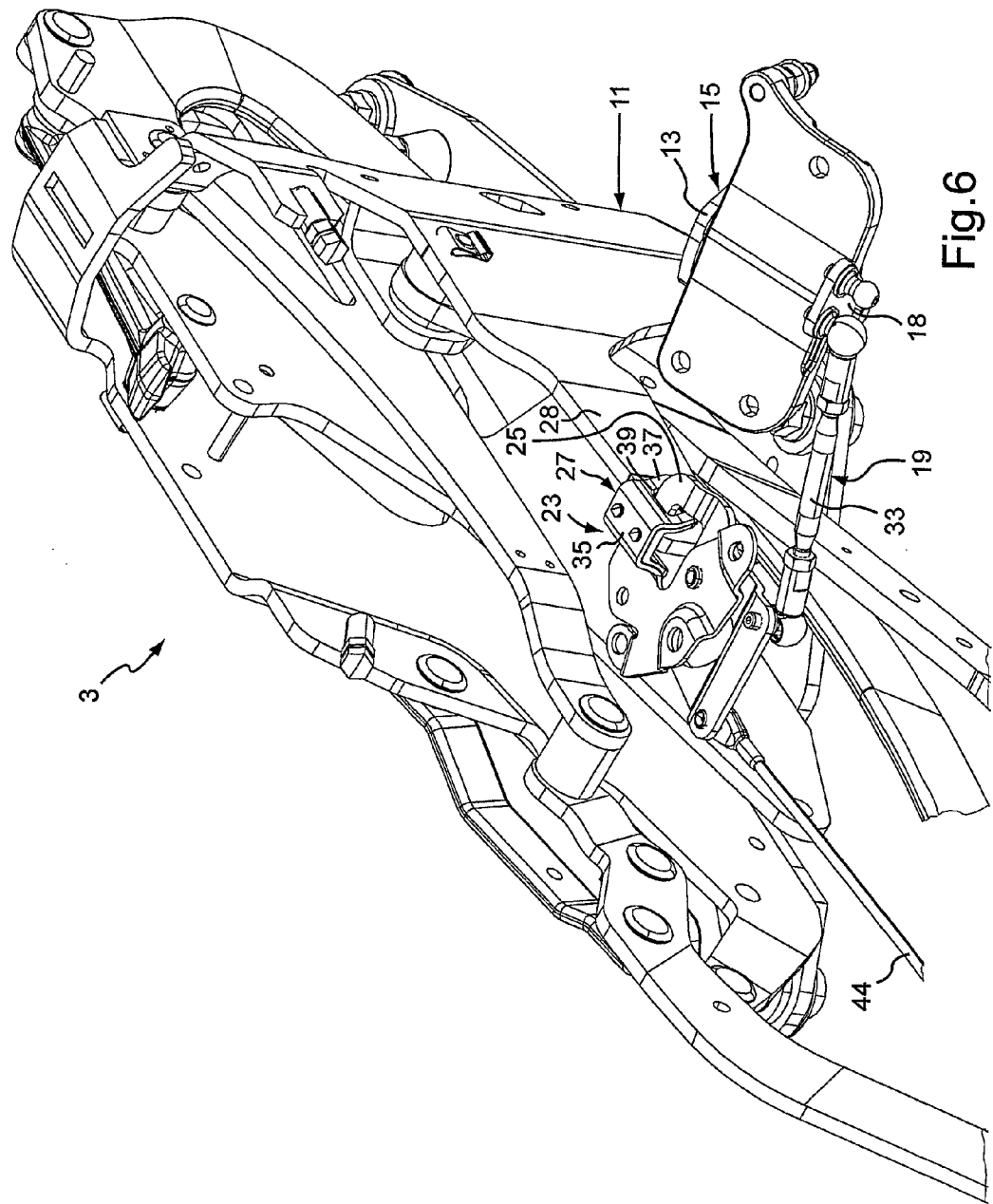
FIG. 6 shows a simplified three-dimensional representation of the top linkage of FIG. 5 from a different perspective.

When the top 3 moves from a closed position into an open position, the top linkage 9 is moved such that the locking apparatus 23, as shown in FIGS. 3 and 4, is moved toward the counter-bearing 28 at the main bearing 11 until the U-shaped region 35 of the sheet metal element 27 cooperates with the counter-bearing 28 and the locking hook 25 of the locking apparatus 23, as shown in FIGS. 5 and 6, can be brought into engagement with the cut-out 29 of the counter-bearing 28.

In order to fix the top linkage 9 to the counter-bearing 28 with the locking apparatus 23, the locking hook 25 is connected to a coupling rod 33. The end of the coupling rod 33 remote from the locking hook 25 is connected to the articulated lever 18. The articulated lever 18 is rotated about the bolt 22 by movement of the drive rod 20 of the linkage 19. The drive rod 20 is moved by the center drive 17 towards the center drive 17, thereby moving the coupling rod 33, which is connected to the articulated lever 18. The coupling rod 33 moves at least approximately in the transverse direction of the top.

This translatory movement of the coupling rod 33, rotates the locking hook 25 counterclockwise about its pivotal connection with the sheet metal element 27 so that a bolt-like element 42, such as shown in FIG. 6, formed at the tip of the locking hook 25 is rotated into the cut-out 29 of the counter bearing 28.

The top linkage 9 cannot be moved upward with the locking hook 25 in the position shown in FIGS. 5 and 6, since the region 30 above the cut-out 29 of the counter-bearing 28 prevents such a movement by the bolt-like element 42 of the locking hook 25. The top 3 is securely fixed to the body in its stowage position, which is particularly advantageous when the convertible vehicle is moving.

To release the top 3 from the secured stowage position, the drive rod 20 of the linkage 19 is moved by the center drive 17 towards the latching apparatus 15. The coupling rod 33 is hereby moved via a pivoting of the articulated lever 18 in a direction away from the center drive 17. This rotates the locking hook 25 clockwise about its connection to the sheet metal element 27 and out of the cut-out 29 of the counter-bearing 28. The top 3 can subsequently be moved from an open position into a closed position since the top linkage 9 is no longer held by the counter-bearing 28. The front roof segment 4 with the sheet metal element 27 moves upwardly away from the counter-bearing 28 arranged at the main bearing 11.

A connection rod 44 is furthermore shown in FIG. 2 at which is pivotally connected at its one end to the locking hook 25 and is connected at its opposite end to a latching element 46.

The latching element 465 has elongate holes 48 for guidance which can be brought into engagement with bolts on the roof segment 5 in a closed position of the top 3. For this purpose, a rotation of the locking hook 25 caused by the center drive 17 is converted into a movement of the connection rod 44 by means of which the bolts of the other roof segments 4 or 5 respectively can be connected to the latching element 46.

The connection of the roof segments 4, 5 can thus be realized in an advantageous manner by means of the center drive 17.

The invention claimed is:

1. A top for a convertible vehicle of the type having a body with a windshield frame at a forward end of a passenger compartment, comprising:
   a foldable roof having a top linkage operable to move the foldable roof between a closed position in which it can be fixed to a windshield frame and an open position in which it is stowed in a rear side stowage position;
   a latching apparatus having a drive member and at least one closure hook connected thereto by a linkage, the at least one closure hook being movably supported on the roof, the latching apparatus operable to fix the foldable roof to the windshield frame when the roof is in the closed position; and
   a locking apparatus for locking the roof in the rear-side stowage position, the locking apparatus having at least one locking member and a counter-bearing disposed on the vehicle body, the at least one locking member being separate from the at least one closure hook and being separately and movably supported on the roof;
   wherein both the locking apparatus and the latching apparatus are actuated by the drive member.

2. A top in accordance with claim 1, further comprising:
   a main bearing disposed on the vehicle body, the top linkage being interconnected with the main bearing;
   the counter-bearing being integral with the main bearing; and
   the locking member being fixable in the counter-bearing when the top is in the rear-side stowage position.

3. A top in accordance with claim 1, wherein:
   the locking member is a locking hook.

4. A top for a convertible vehicle of the type having a body with a windshield frame at a forward end of a passenger compartment, comprising:
   a foldable roof having a top linkage operable to move the foldable roof between a closed position in which it can be fixed to a windshield frame and an open position in which it is stowed in a rear side stowage position;
   a latching apparatus having a drive member and at least one closure hook connected thereto by a linkage, the latching apparatus operable to fix the foldable roof to the windshield frame when the roof is in the closed position; and
   a locking apparatus for locking the roof in the rear-side stowage position, the locking apparatus having at least one locking member and a counter-bearing disposed on the vehicle body;
   the locking member being a locking hook having a bolt-like member;
   the counter-bearing having a cut-out defined therein; and
   the bolt-like member of the locking hook engages the cut-out in the counter-bearing when the top is in the stowage position
   wherein both the locking apparatus and the latching apparatus are actuated by the drive member.

5. A top in accordance with claim 1, wherein:
   the drive member actuates the locking member of the locking apparatus via the linkage of the latching apparatus; and
   the drive member being disposed at a front end of the top generally centrally with respect to a width of the vehicle.

6. A top for a convertible vehicle of the type having a body with a windshield frame at a forward end of a passenger compartment, comprising:
   a foldable roof having a top linkage operable to move the foldable roof between a closed position in which it can be fixed to a windshield frame and an open position in which it is stowed in a rear side stowage position;
   a latching apparatus having a drive member and at least one closure hook connected thereto by a linkage, the latching apparatus operable to fix the foldable roof to the windshield frame when the roof is in the closed position; and
   a locking apparatus for locking the roof in the rear-side stowage position, the locking apparatus having at least one locking member and a counter-bearing disposed on the vehicle body, the locking apparatus further having a coupling rod connecting the linkage to the locking member for actuating the locking member, the linkage extending generally in the transverse direction of the top;
   wherein both the locking apparatus and the latching apparatus are actuated by the drive member, the drive member actuating the locking member of the locking apparatus via the linkage of the latching apparatus, and the drive member being disposed at a front end of the top generally centrally with respect to a width of the vehicle.

7. A top in accordance with claim 6, wherein:
   the linkage includes a drive rod which is pivotally connected to the closure hook;
   the coupling rod is substantially coaxial with the drive rod.

8. A top for a convertible vehicle of the type having a body with a windshield frame at a forward end of a passenger compartment, comprising:
   a foldable roof having a top linkage operable to move the foldable roof between a closed position in which it can be fixed to a windshield frame and an open position in which it is stowed in a rear side stowage position;
   a latching apparatus having a drive member and at least one closure hook connected thereto by a linkage, the latching apparatus operable to fix the foldable roof to the windshield frame when the roof is in the closed position;
   a locking apparatus for locking the roof in the rear-side stowage position, the locking apparatus having at least one locking member and a counter-bearing disposed on the vehicle body;
   a latching member for latching roof parts of the foldable roof to one another; and
   at least one connection rod extending in the longitudinal direction of the vehicle, the connection rod having one end pivotally interconnected with the locking member and an opposite end interconnected with the latching members;
   wherein both the locking apparatus and the latching apparatus are actuated by the drive member.

* * * * *